(12) United States Patent
Lee

(10) Patent No.: US 11,126,834 B2
(45) Date of Patent: Sep. 21, 2021

(54) APPARATUS AND METHOD FOR DETECTING PROXIMITY OF USER

(71) Applicant: LG ELECTRONICS INC., Seoul (KR)

(72) Inventor: Kye Chul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 16/562,086

(22) Filed: Sep. 5, 2019

(65) Prior Publication Data

US 2020/0005030 A1    Jan. 2, 2020

(30) Foreign Application Priority Data

Aug. 14, 2019  (KR) .................. 10-2019-0099397

(51) Int. Cl.
*G06K 9/00* (2006.01)
*H04W 4/44* (2018.01)
*H04W 72/00* (2009.01)
*H04W 72/04* (2009.01)
*H04W 4/02* (2018.01)
(Continued)

(52) U.S. Cl.
CPC .......... *G06K 9/00369* (2013.01); *G01S 7/417* (2013.01); *G01S 13/04* (2013.01); *G05D 1/0276* (2013.01); *G06K 9/4652* (2013.01); *G06K 9/6257* (2013.01); *H04B 1/7136* (2013.01); *H04W 4/023* (2013.01); *H04W 4/44* (2018.02); *H04W 72/005* (2013.01);
(Continued)

(58) Field of Classification Search
CPC ............. G06K 9/00369; G06K 9/4652; G06K 9/6257; H04W 4/44; H04W 4/023; H04W 72/005; H04W 72/042; H04W 72/0453; G01S 13/04; G05D 1/0276; G05D 2201/0213; H04B 1/7136; B60L 53/60
See application file for complete search history.

(56) References Cited

U.S. PATENT DOCUMENTS

2016/0261268 A1* 9/2016 Rakova .................. G06N 7/005
2019/0302250 A1* 10/2019 Sahin ...................... G01S 13/32
2020/0125158 A1* 4/2020 Giusti ..................... G01S 13/04

FOREIGN PATENT DOCUMENTS

KR    10-2018-0069645 A    6/2018
WO    WO-2011130630 A1 * 10/2011 ............ H04W 8/005

* cited by examiner

*Primary Examiner* — Ping Y Hsieh
*Assistant Examiner* — Xiao Liu
(74) *Attorney, Agent, or Firm* — Birch, Stewart, Kolasch & Birch, LLP

(57) ABSTRACT

A user proximity detection device including a receiver configured to receive a signal in a target frequency band, an inference-purpose data generator configured to measure an intensity of a signal received through the receiver and generate inference-purpose data based on the measured intensity of the signal, and a proximity detector configured to input the inference-purpose data into a human body proximity inference machine learning model to determine whether a human body is in proximity. The target frequency band is selected from a broadcast frequency band. In addition, at least one of an autonomous vehicle a user terminal or a server is linked or converged with an artificial intelligence module, an Unmanned Aerial Vehicle (UAV), a robot, an Augmented Reality (AR) device, Virtual Reality (VR), and devices related to 5G service.

18 Claims, 17 Drawing Sheets
(5 of 17 Drawing Sheet(s) Filed in Color)

(51) Int. Cl.
*G06K 9/62* (2006.01)
*G06K 9/46* (2006.01)
*G01S 13/04* (2006.01)
*G01S 7/41* (2006.01)
*G05D 1/02* (2020.01)
*H04B 1/7136* (2011.01)
*B60L 53/60* (2019.01)

(52) U.S. Cl.
CPC ..... *H04W 72/042* (2013.01); *H04W 72/0453* (2013.01); *B60L 53/60* (2019.02); *G05D 2201/0213* (2013.01)

APPARATUS AND METHOD FOR DETECTING PROXIMITY OF USER

CROSS-REFERENCE TO RELATED APPLICATION

This non-provisional application claims the benefit under 35 U.S.C. § 119(a) to Patent Application No. 10-2019-0099397, filed in the Republic of Korea on Aug. 14, 2019, which is hereby expressly incorporated by reference into the present application.

BACKGROUND

1. Technical Field

The present disclosure relates to a human proximity detection technology, and more particularly, to a user proximity detection device and method that can detect the proximity of the human body using the interference phenomenon of the broadcast signal.

2. Description of Related Art

Technology for controlling various devices by detecting the presence of a person within a predetermined area has been utilized in various fields. This human body proximity detection technology is used to control not only home appliances in the home but also to control devices installed in public facilities so that this allows users to use the device more conveniently.

In relation to one of the conventional methods for detecting the proximity of the human body described above, as disclosed in Korean Patent Publication No. 2018-0069645, there is a method of applying a voltage that changes every time the human body, which is an infrared radiator, enters into or exits from the detection area by using a passive infrared ray (PIR) sensor and detecting the proximity of the human body by amplifying the applied voltage value.

But, according to the conventional human body detection device disclosed in the above-described Korean Patent Publication No. 2018-0069645, if there is no human body movement, since the output voltage of the PIR sensor does not change, while the user is stationary, the proximity cannot be recognized.

For this reason, there is a problem in that the presence or absence of the user cannot be recognized while the user is not moving even if the user is within a predetermined human body detection area.

Therefore, there is a need for a technology capable of detecting the proximity of the human body regardless of the movement of the user.

PRIOR ART DOCUMENTS

Patent Documents

Korean Patent Publication No. 2018-0069645

SUMMARY OF THE INVENTION

An aspect of the present disclosure is to provide a user proximity detection device and method in which human body proximity is recognized by using broadcast signal interference phenomenon according to proximity of human body, instead of amplifying a changing output voltage in response to the movement of the infrared radiator.

Another aspect of the present disclosure is to provide a user proximity detection device and method that can detect the proximity of the human body in distinction from the object.

Another aspect of the present disclosure is to provide a user proximity detection device and method for detecting whether a user exists in a predetermined area by using a receiver that receives a broadcast signal without installing a separate transmitter as the broadcast signal interference phenomenon according to the proximity of the human body is used to recognize the proximity of the human body.

The present disclosure is not limited to what has been described above, and other aspects not mentioned herein will be apparent from the following description to one of ordinary skill in the art to which the present disclosure pertains.

In order to achieve the above object, a user proximity detection device according to an embodiment of the present disclosure receives a signal of a broadcast frequency band, and inputs data reflecting the intensity of the received signal into a machine learning model to determine whether the human body is in proximity.

Specifically, according to an embodiment of the present disclosure, a user proximity detection device includes a receiver configured to receive a signal in a target frequency band, an inference-purpose data generator configured to measure an intensity of a signal received through the receiver and generate inference-purpose data based on the measured intensity of the signal, and a proximity detector configured to input the inference-purpose data into a human body proximity inference machine learning model to determine whether a human body is in proximity, and the target frequency band is selected from a broadcast frequency band.

According to an embodiment of the present disclosure, the user proximity detection device may further include a first target frequency selector configured to obtain data through frequency hopping, perform Forward Discrete Fourier Transform on the obtained data to obtain a signal intensity value, and select the target frequency band based on the obtained signal intensity value.

According to an embodiment of the present disclosure, as local information is obtained, the first target frequency selector may generate a hopping-purpose frequency list including a local broadcast frequency band corresponding to the local information and perform the frequency hopping based on the generated hopping-purpose frequency list.

According to an embodiment of the present disclosure, the user proximity detection device may further include a second target frequency selector configured to obtain data through frequency hopping, perform Forward Discrete Fourier Transform on the obtained data to obtain a signal intensity value, and select the target frequency band based on a correlation between the obtained signal intensity value and whether user is in proximity or not.

According to an embodiment of the present disclosure, the inference-purpose data may be image data obtained by converting a value of the intensity of the signal received through the receiver into a color value of a pre-mapped color gamut.

According to an embodiment of the present disclosure, the receiver may receive a signal including at least two target frequency bands of a first target frequency band and a second target frequency band, and the inference-purpose data may be data that connects first image data and second image data based on the same time axis, in which the first image data is obtained by converting the value of the intensity of the signal of the first target frequency band into a color value of a pre-mapped color gamut and the second image data is obtained by converting the value of the intensity of the signal of the second target frequency band into a color value of a pre-mapped color gamut.

According to an embodiment of the present disclosure, the human body proximity inference machine learning model may be a model that is learned by first learning-purpose data and second learning-purpose data and infers whether a human body is in proximity when the inference-purpose data is inputted in which the first learning-purpose data that is a data set including: image data obtained by converting the value of the intensity of the signal received through the receiver into a color value of a pre-mapped color gamut under a human body proximity environment; and a proximity label, and the second learning-purpose data is a data set including: image data obtained by converting the value of the intensity of the signal received through the receiver into pre-mapped color value under a human body non-proximity environment; and a non-proximity label.

According to an embodiment of the present disclosure, the human body proximity inference machine learning model may be a multi layer perceptron neural network model.

According to an embodiment of the present disclosure, the user proximity detection device may further include a communicator, and the proximity detector may generate a control signal for activating an external device according to the determination that a human body is in proximity, and transmit the generated control signal through the communicator.

According to an embodiment of the present disclosure, the user proximity detection device may further include a communicator, and the communicator may receive the local information based on a downlink grant of a 5G network connected for driving in an autonomous driving mode.

According to an embodiment of the present disclosure, a user proximity detection method includes a first step of receiving a signal in a target frequency band, a second step of measuring an intensity of a signal received from the first step and generating inference-purpose data based on the measured intensity of the signal, and a third step of inputting the inference-purpose data into a human body proximity inference machine learning model to determine whether a human body is in proximity, and the target frequency band is selected from a broadcast frequency band.

According to an embodiment of the present disclosure, the user proximity detection method may further include a frequency band selection step of obtaining data through frequency hopping, performing Forward Discrete Fourier Transform on the obtained data to obtain a signal intensity value, and selecting the target frequency band based on the obtained signal intensity value.

According to an embodiment of the present disclosure, the frequency hopping may be performed based on a hopping-purpose frequency list including a local broadcast frequency band.

According to an embodiment of the present disclosure, the user proximity detection method may further include a step of obtaining data through frequency hopping, performing Forward Discrete Fourier Transform on the obtained data to obtain a signal intensity value, and selecting the target frequency band based on a correlation between the obtained signal intensity value and whether user is in proximity or not.

According to an embodiment of the present disclosure, the inference-purpose data may be image data obtained by converting a value of the intensity of the signal received from the first step into a color value of a pre-mapped color gamut.

According to an embodiment of the present disclosure, the target frequency band may include at least two target frequency bands of a first target frequency band and a second target frequency band, and the inference-purpose data may be data that connects first image data and second image data based on the same time axis, in which the first image data is obtained by converting the value of the intensity of the signal of the first target frequency band into a color value of a pre-mapped color gamut and the second image data is obtained by converting the value of the intensity of the signal of the second target frequency band into a color value of a pre-mapped color gamut.

According to an embodiment of the present disclosure, the human body proximity inference machine learning model may be a model that is learned by first learning-purpose data and second learning-purpose data and infers whether a human body is in proximity when the inference-purpose data is inputted in which the first learning-purpose data that is a data set including: image data obtained by converting the value of the intensity of the signal received from the first step into a color value of a pre-mapped color gamut under a human body proximity environment;; and a proximity label, and the second learning-purpose data is a data set including: image data obtained by converting the value of the intensity of the signal received from the first step into pre-mapped color value under a human body non-proximity environment; and a non-proximity label.

According to an embodiment of the present disclosure, the human body proximity inference machine learning model may be a multi layer perceptron neural network model.

According to an embodiment of the present disclosure, the user proximity detection method may further include a step of generating a control signal for activating an external device according to the determination that a human body is in proximity, and transmits the generated control signal.

According to an embodiment of the present disclosure, a computer-readable recording medium that records a program that detects user proximity includes a first means configured to receive a signal in a target frequency band, a second means configured to measure an intensity of a signal received from the first step and generate inference-purpose data based on the measured intensity of the signal, and a third means configured to input the inference-purpose data into a human body proximity inference machine learning model to determine whether a human body is in proximity, and the target frequency band is selected from a broadcast frequency band.

Details of other embodiments will be included in the detailed description and the drawings.

BRIEF DESCRIPTION OF THE DRAWINGS

The patent or application file contains at least one color drawing. Copies of this patent or patent application publication with color drawing will be provided by the USPTO upon request and payment of the necessary fee.

DETAILED DESCRIPTION

Figure 1:
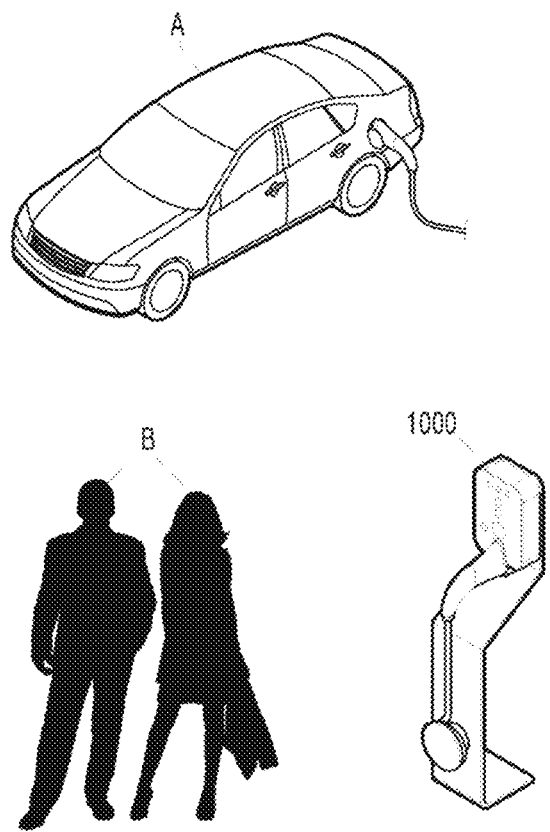
FIG. 1 is a diagram illustrating a system to which a user proximity detection device is applied according to an embodiment of the present disclosure.

Hereinafter, the embodiments disclosed in the present specification will be described in detail with reference to the accompanying drawings, the same or similar elements regardless of a reference numeral is denoted by the same reference numeral and a duplicate description thereof will be omitted. In the following description, the terms "module" and "unit" for referring to elements are assigned and used exchangeably in consideration of convenience of explanation, and thus, the terms per se do not necessarily have different meanings or functions. In the following description of the embodiments disclosed herein, the detailed description of related known technology will be omitted when it may obscure the subject matter of the embodiments according to the present disclosure. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like, may be used herein to describe various elements, components, regions, layers, and/or sections, these elements, components, regions, layers, and/or sections should not be limited by these terms. These terms are generally only used to distinguish one element from another.

It should be understood that when an element is referred to as being "connected to," or "coupled to" another element, it can be directly connected or coupled to the other element, but intervening elements can also be present. The terms "connected" and "coupled" are not restricted to physical or mechanical connections or couplings, and can include electrical connections or couplings, whether direct or indirect.

The connection can be such that the objects are permanently connected or releasably connected.

It must be noted that as used herein and in the appended claims, the singular forms "a," "an," and "the" include the plural references unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A vehicle described in this specification refers to a car, a motorcycle, and the like. Hereinafter, the vehicle will be exemplified as a car.

The vehicle described in the specification may include, but is not limited to, a vehicle having an internal combustion engine as a power source, a hybrid vehicle having an engine and an electric motor as a power source, and an electric vehicle having an electric motor as a power source.

FIG. 1 is a diagram illustrating a system to which a user proximity detection device is applied according to an embodiment of the present disclosure.

Referring to FIG. 1, the user proximity detection device 1000 is installed in the form of a smart box, for example, at an electrified vehicle (EV) charging station. If a vehicle A or a person B approaches, it is possible to accurately detect whether the person B is approaching in addition to distinguishing the vehicle A or the person B by analyzing the strength of the broadcast signal that changes according to the resonance characteristics of the person B.

Figure 2:
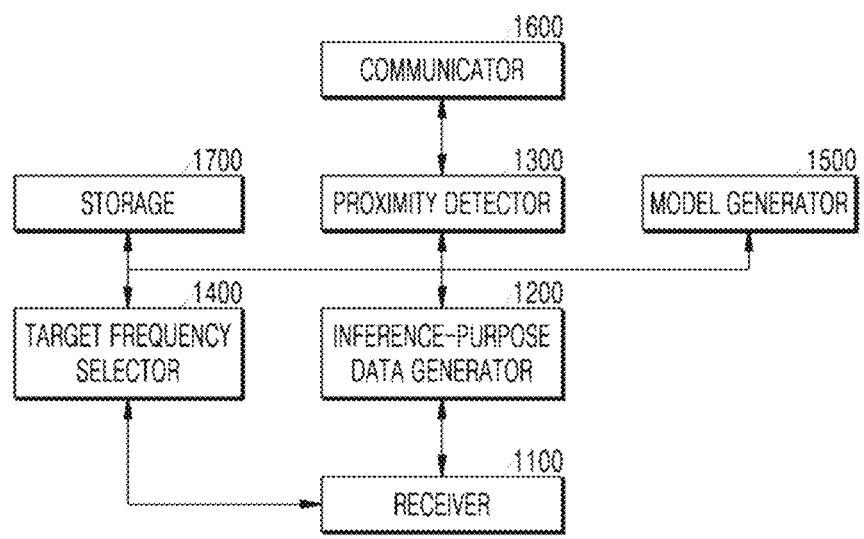
FIG. 2 is a block diagram illustrating a user proximity detection device according to an embodiment of the present disclosure.

FIG. 2 is a block diagram illustrating a user proximity detection device installed at a vehicle side according to an embodiment of the present disclosure.

Referring to FIG. 2, the user proximity detection device may include a receiver 1100, an inference-purpose data generator 1200, a proximity detector 1300, a target frequency selector 1400, a model generator 1500, a communicator 1600, and a storage 1700.

The user proximity detection device 1000 according to an embodiment may include other components in addition to the components shown in FIG. 2 and described below, or may not include some of the components shown in FIG. 2 and described below.

The receiver 1100 may receive a signal of a target frequency band and provide the received signal to the inference-purpose data generator 1200. In this case, the receiver 1100 may acquire the wireless signal data of the public broadcast which can be received in a corresponding region by selecting a target frequency band from broadcast frequency bands.

The receiver 1100 may receive a signal including at least two target frequency bands of the first target frequency band and the second target frequency band, and provide the received signal to the inference-purpose data generator 1200.

The receiver 1100 may include a reception antenna, a radio frequency (RF) circuit capable of implementing various communication protocols, and an RF device to perform communication, and may be an RTL2832U-based Software Defined Radio (SDR) dongle but is not limited thereto.

The inference-purpose data generator 1200 may measure the intensity of the signal received through the receiver 1100, generate inference-purpose data based on the measured intensity of the signal, and provide the generated inference-purpose data to the proximity detector 1300.

The inference-purpose data generator 1200 may perform a pre-processing process of converting a signal received through the receiver 1100 into data in a form that can be used by the proximity detector 1300 or the model generator 1500.

The inference-purpose data generator 1200 may perform a Forward Discrete Fourier Transform (FDFT) on the signal data received through the receiver 1100 to obtain data converted to a signal intensity value.

Here, the inference-purpose data may be image data obtained by converting an intensity value of a signal received through the receiver 1100 into a color value of a pre-mapped color gamut.

For example, the inference-purpose data generator 1200 may divide the color spectrum into N steps and obtain image data obtained by converting the signal intensity to a color value by applying the following equation.

$$\text{color value} = \frac{(\text{signal intensity} - \text{signal intensity}_{min}) \times N}{(\text{signal intensity}_{max} - \text{signal intensity}_{min})} \quad \text{[Equation 1]}$$

Here, max means a maximum value and min means a minimum value.

The inference-purpose data generator 1200 may generate image data according to a predefined image pixel conversion ratio. For example, the inference-purpose data generator 1200 may allocate a predetermined number of pixels for each time and frequency to a signal of a target frequency band, and generate image data by allocating a color value corresponding to the intensity of a corresponding time and a corresponding frequency for each pixel.

The inference-purpose data generator 1200 may increase the accuracy of the inference-purpose data by increasing the number of pixels allocated to a signal of a target frequency band by each time and frequency, that is, by increasing the resolution.

In addition, the inference-purpose data may be data that connects first image data and second image data on the basis of the same time axis in which the first image data is obtained through Equation 1 above by converting the intensity value of the signal of the first target frequency band to the color value of the pre-mapped color gamut and the second image data is obtained by converting the intensity value of the signal of the second target frequency band to the color value of a pre-mapped color gamut.

The proximity detector 1300 may input inference-purpose data into the human body proximity inference machine learning model to determine whether the human body is in proximity.

The proximity detector 1300 may be provided with inference-purpose data by activating the inference-purpose data generator 1200 according to execution conditions such as input of a user's request signal and arrival of a predetermined period, and may input the received inference-purpose data into the human body proximity inference machine learning model to determine the proximity or non-proximity situation of the human body.

If enough time to determine proximity of the human body is given, the proximity detector 1300 may be repeatedly provided with inference-purpose data to increase the accuracy of proximity determination.

As it is determined that the human body is in proximity, the proximity detector 1300 may generate a control signal for activating an external device.

For example, as it is determined that the human body is in proximity when the illumination is below a certain level, the proximity detector 1300 may generate a control signal for turning on a lighting device, and as it is determined that the human body is moving away, generate a control signal for turning off the lighting device.

For example, as it is determined that the human body is in proximity, the proximity detector 1300 may generate a control signal for turning on a TV, and as it is determined that the human body is moving away while watching the TV, generate a control signal for turning off the TV.

As it is determined that the human body moves away during movie playback, the proximity detector 1300 can generate a control signal to pause playback of the movie, and as it is determined that the human body is in proximity while the movie is paused, generate a control signal for playing back the movie.

The target frequency selector 1400 may acquire data through frequency hopping, perform Forward Discrete Fourier Transform on the acquired data to obtain a signal intensity value, and select the target frequency band based on the acquired signal intensity value. For example, the target frequency selector 1400 may calculate a moving average for a predetermined time with respect to the obtained signal intensity value, and select n upper channels, for example, 2 (two) or 3 (three) channels, having a large calculated moving average value, as target frequency bands.

As obtaining local information, the target frequency selector 1400 may generate a hopping-purpose frequency list including local broadcasting frequency bands corresponding to local information, for example, medium frequency (MF), high frequency (HF), very high frequency (VHF), and ultra high frequency (UHF) channels, and perform frequency hopping based on the generated hopping frequency list.

The target frequency selector 1400 may acquire data through frequency hopping, perform Forward Discrete Fourier Transform on the acquired data to obtain a signal intensity value, and select the target frequency band based on the correlation between the acquired signal intensity value and the user proximity. For example, the target frequency selector 1400 may sets a value corresponding to proximity to 0 and a value corresponding to non-proximity to 1, calculate a correlation value between the signal intensity value and a value corresponding to proximity or non-proximity, and select n upper channels, for example, 2 (two) or 3 (three) channels, having a large absolute value of the calculated correlation value, as target frequency bands.

The model generator 1500 may generate a human body proximity inference machine learning model by performing machine learning after receiving the learning-purpose data generated by the inference-purpose data generator 1200.

The model generator 1500 may generate a model that learns characteristic changes according to whether human body proximity is present in the plurality of learning-purpose data.

Here, a human body proximity inference machine learning model may be a model for inferring the proximity of the human body when inference-purpose data is input through learning by first learning-purpose data and second learning-purpose data in which the first learning-purpose data that is a data set including: image data obtained by converting an intensity value of a signal received through the receiver 1100 into a color value of a pre-mapped color gamut under a human body proximity environment; and a proximity label, and the second learning-purpose data is a data set including: image data obtained by converting the intensity value of the signal received through the receiver 1100 into a pre-mapped color value in a human body non-proximity environment; and a non-proximity label.

Meanwhile, the human body proximity inference machine learning model may be a multi layer perceptron neural network model or a convolutional neural network model, but is not limited thereto.

Artificial intelligence (AI) is a field of computer engineering and information technology that researches a method for the computer to enable thinking, learning, self-development, etc. which are possible by human's intelligence, and means that the computer can imitate human's intelligent behavior.

In addition, the Artificial Intelligence does not exist in itself, but has many direct and indirect links with other fields of computer science. In recent years, there have been numerous attempts to introduce an element of AI into various fields of information technology to solve problems in the respective fields.

Machine Learning is a field of Artificial Intelligence, and a field of research that gives the ability capable of learning without an explicit program in the computer.

Specifically, the Machine Learning can be a technology for researching and constructing a system for learning, predicting, and improving its own performance based on empirical data and an algorithm for the same. The algorithms of the Machine Learning take a method of constructing a specific model in order to obtain the prediction or the determination based on the input data, rather than performing the strictly defined static program instructions.

The term 'machine learning' can be used interchangeably with the term 'mechanical learning'.

Many Machine Learning algorithms have been developed on how to classify data in the Machine Learning. Decision Tree, Bayesian network, Support Vector Machine (SVM), Artificial Neural Network (ANN), etc. are representative examples.

The Decision Tree is an analytical method that performs classification and prediction by plotting a Decision Rule in a tree structure.

The Bayesian network is a model of the probabilistic relationship (conditional independence) between multiple variables in a graphical structure. The Bayesian network is suitable for data mining through Unsupervised Learning.

The Support Vector Machine is a model of Supervised Learning for pattern recognition and data analysis, and mainly used for classification and regression.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that has artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the Artificial Neural Network can include the synapse for connecting between neuron and neuron.

The Artificial Neural Network can be generally defined by three factors, that is, (1) a connection pattern between neurons of different layers, (2) a learning process updating the weight of connection, (3) an activation function generating an output value from the weighted sum of the input received from a previous layer.

The Artificial Neural Network can include network models of the method such as Deep Neural Network (DNN), Recurrent Neural Network (RNN), Bidirectional Recurrent Deep Neural Network (BRDNN), Multilayer Perceptron (MLP), and Convolutional Neural Network (CNN), but is not limited thereto.

In this specification, the term 'layer' can be used interchangeably with the term 'level'.

An ANN may be classified as a single-layer neural network or a multi-layer neural network, based on the number of layers therein.

In general, a single-layer neural network may include an input layer and an output layer.

In addition, a general Multi-Layer Neural Network is composed of an Input layer, one or more Hidden layers, and an Output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The output layer receives a signal from the hidden layer and outputs an output value based on the received signal. The Input signal between neurons is multiplied by each connection strength (weight) and then summed, and if the sum is larger than the threshold of the neuron, the neuron is activated to output the output value obtained through the activation function.

Meanwhile, the Deep Neural Network including a plurality of Hidden layers between the Input layer and the Output layer can be a representative Artificial Neural Network that implements Deep Learning, which is a type of Machine Learning technology.

On the other hand, the term 'deep learning' can be used interchangeably with the term 'in-depth learning'.

The Artificial Neural Network can be trained by using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

Meanwhile, the training data represents a plurality of features, and the labeling the label on the training data can mean that the feature represented by the training data is labeled. In this case, the training data can represent the feature of the input object in the form of a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

In this specification, the term 'grouping' can be used interchangeably with the term 'clustering'.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

The Reinforcement Learning can be mainly performed by a Markov Decision Process (MDP).

Explaining the Markov Decision Process, firstly, the environment in which the agent has the necessary information to do the following actions is given, secondly, it is defined how the agent behaves in the environment, thirdly, it is defined how to give reward or penalty to the agent, and fourthly, the best policy is obtained by repeatedly experiencing until the future reward reaches its peak.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. In SGD, momentum and NAG are techniques that increase the optimization accuracy by adjusting the step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The inference-purpose data generator 1200, the proximity detector 1300, the target frequency selector 1400, and the model generator 1500 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), Processors, Controllers, Micro-controllers, Microprocessors, or electrical units for performing other functions.

The communicator 1600 may be a module for performing communication with an external device. Here, the external device may be a lighting device, a home appliance, a user terminal, another vehicle, or a server.

The communicator 1600 may receive and transmit a control signal for controlling an external device from the proximity detector 1300.

A vehicle equipped with the user proximity detection device 1000 may be switched from autonomous driving mode to manual mode or from manual mode to autonomous driving mode depending on driving conditions. Here, the driving situation may be determined by the information received by the communicator 1600.

The communicator 1600 may receive, from the server, local information including a local broadcast frequency band list based on a downlink grant of the 5G network.

The communicator 1600 may include at least one among a transmission antenna, a reception antenna, a radio frequency (RF) circuit capable of implementing various communication protocols, and an RF element in order to perform communication.

The communicator 1600 may perform short range communication, GPS signal reception, V2X communication, optical communication, broadcast transmission and reception, and Intelligent Transport Systems (ITS) communication functions.

According to an embodiment, the communicator 1600 may further support other functions in addition to the described functions, or may not support some of the described functions.

The communicator 1600 may support short-range communication by using at least one among Bluetooth™, Radio Frequency Identification (RFID), Infrared Data Association (IrDA), Ultra WideBand (UWB), ZigBee, Near Field Communication (NFC), Wireless-Fidelity (Wi-Fi), Wi-Fi Direct, and Wireless Universal Serial Bus (Wireless USB) technologies.

The communicator 1600 may form short-range wireless networks to perform short-range communication between the vehicle and at least one external device.

The communication unit 1600 may include a Global Positioning System (GPS) module or a Differential Global Positioning System (DGPS) module for obtaining location information of the vehicle.

The communicator 1600 may include a module for supporting wireless communication between the vehicle and a server (V2I: vehicle to infrastructure), communication with another vehicle (V2V: vehicle to vehicle) or communication with a pedestrian (V2P: vehicle to pedestrian). That is, the communicator 1100 may include a V2X communication module. The V2X communication module may include an RF circuit capable of implementing V2I, V2V, and V2P communication protocols.

The communicator 1600 may receive a hazard information broadcast signal transmitted by another vehicle through the V2X communication module, and may transmit a hazard information query signal and receive a hazard information response signal in response thereto.

The communicator 1600 may include an optical communication module for performing communication with an external device via light. The optical communication module may include both a light transmitting module for converting electrical signals into optical signals and transmitting the optical signals to the outside, and a light receiving module for converting the received optical signals into electrical signals.

According to an embodiment, the light transmitting module may be integrally formed with a lamp included in the vehicle.

The communicator 1600 may include a broadcast communication module for receiving broadcast signals from an external broadcast management server, or transmitting broadcast signals to the broadcast management server through broadcast channels. Examples of the broadcast channels may include a satellite channel and a terrestrial channel. Example of the broadcast signal may include a TV broadcast signal, a radio broadcast signal, and a data broadcast signal.

The communicator 1600 may include an ITS communication module that exchanges information, data or signals with a traffic system. The ITS communication module may provide the obtained information and data to the traffic system. The ITS communication module may receive information, data, or signals from the traffic system. For example, the ITS communication module may receive road traffic information from the communication system and provide the road traffic information to the vehicle controller 1200. For example, the ITS communication module may receive control signals from the traffic system and provide the control signals to the vehicle controller 1200 or a processor provided in the vehicle.

Depending on the embodiment, the overall operation of each module of the communicator 1600 may be controlled by a separate process provided in the communicator 1600. The communicator 1600 may include a plurality of processors, or may not include a processor. When a processor is not included in the communicator 1600, the communicator 1600 may be operated by either a processor of another apparatus in the vehicle or the vehicle controller 1200.

The communicator 1600 may, together with the vehicle user interface 1300, implement a vehicle-use display device. In this case, the vehicle-use display device may be referred to as a telematics device or an audio video navigation (AVN) device.

Figure 3:
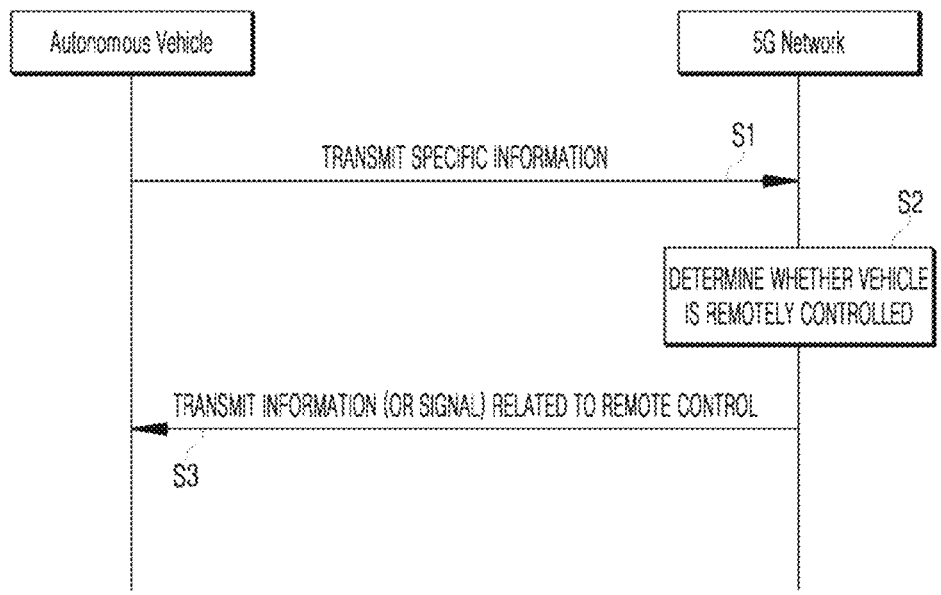
FIG. 3 is a diagram illustrating an example of basic operations of an autonomous vehicle and a 5G network in a 5G communication system.
Figure 4:
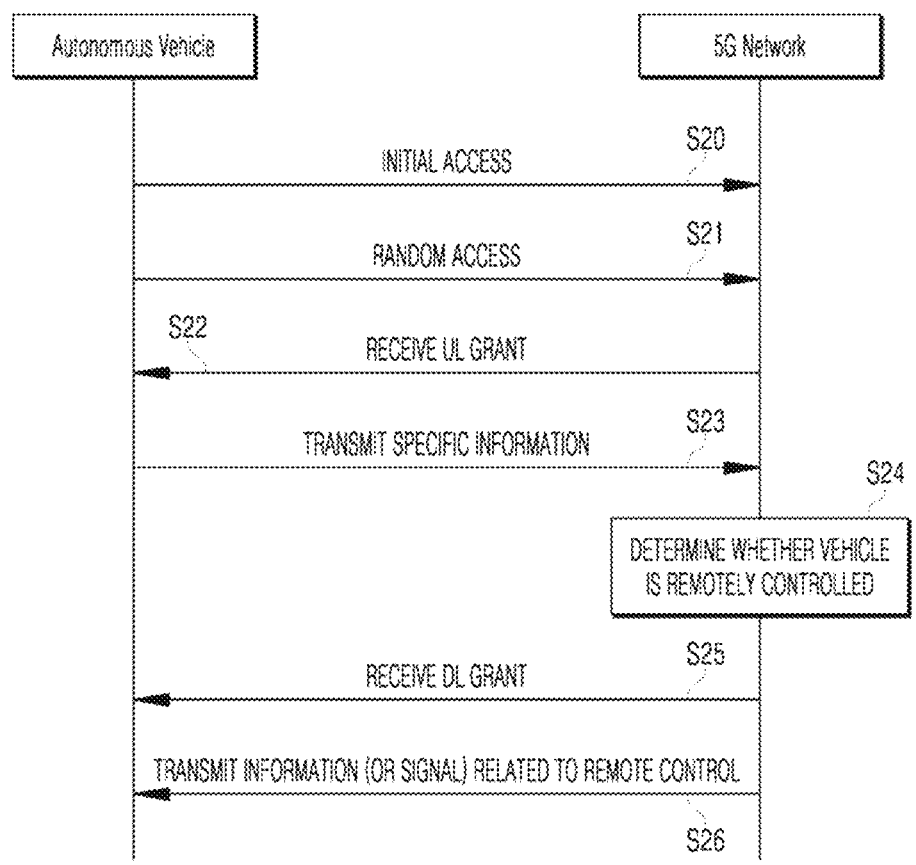
FIG. 4 is a diagram illustrating an example of an application operation of an autonomous vehicle and a 5G network in a 5G communication system.

FIG. 3 is a diagram illustrating an example of basic operations of an autonomous vehicle and a 5G network in a 5G communication system.

The communicator 1600 may transmit specific information to the 5G network when the vehicle is operated in the autonomous driving mode (S1).

The specific information may include autonomous driving related information.

The autonomous driving related information may be information directly related to the driving control of the vehicle. For example, the autonomous driving related information may include at least one among object data indicating an object near the vehicle, map data, vehicle status data, vehicle location data, and driving plan data.

The autonomous driving related information may further include service information necessary for autonomous driving. For example, the specific information may include information on a destination inputted by a user and a safety level of the vehicle.

In addition, the 5G network may determine whether a vehicle is to be remotely controlled (S2).

The 5G network may include a server or a module for performing remote control related to autonomous driving.

The 5G network may transmit information (or a signal) related to the remote control to an autonomous driving vehicle (S3).

As described above, information related to the remote control may be a signal directly applied to the autonomous driving vehicle, and may further include service information necessary for autonomous driving. The autonomous driving vehicle according to this embodiment may receive service information such as insurance for each interval selected on a driving route and risk interval information, through a server connected to the 5G network to provide services related to the autonomous driving.

Hereinafter, the essential process for 5G communication between an autonomous vehicle and a 5G network (for example, an initial access procedure between the vehicle and the 5G network) is described with reference to FIGS. 4 to 8 as follows.

First, an example of an application operation through an autonomous vehicle performed in a 5G communication system and a 5G network is as follows.

The vehicle may perform an initial access process with the 5G network (initial access step, S20). The initial access process may include a cell search process for downlink (DL) synchronization acquisition and a process for obtaining system information.

The vehicle may perform a random access process with the 5G network (random access step, S21). The random access process may include a process for uplink (UL) synchronization acquisition or a preamble transmission process for UL data transmission, or a random access response receiving process.

The 5G network may transmit an Uplink (UL) grant for scheduling transmission of specific information to the autonomous driving vehicle (UL grant receiving step, S22).

The process in which the vehicle receives the UL grant may include a scheduling process for being assigned a time/frequency resource for the transmission of the UL data over the 5G network.

The autonomous driving vehicle may transmit specific information over the 5G network based on the UL grant (specific information transmission step, S23).

The 5G network may determine whether the vehicle is to be remotely controlled based on the specific information transmitted from the vehicle (vehicle remote control determination step, S24).

The autonomous driving vehicle may receive the DL grant through a physical DL control channel for receiving a response on pre-transmitted specific information from the 5G network (DL grant receiving step, S25).

The 5G network may transmit information (or a signal) related to the remote control to the autonomous driving vehicle based on the DL grant (remote control related information transmission step, S26).

A process in which the initial access process and/or the random access process between the 5G network and the autonomous driving vehicle is combined with the DL grant receiving process has been exemplified. However, the present disclosure is not limited thereto.

For example, the initial access process and/or the random access process may be performed through the initial access step, the UL grant receiving step, the specific information transmission step, the vehicle remote control determination step, and the remote control related information transmission step. In addition, for example, the initial access process and/or the random access process may be performed through the random access step, the UL grant receiving step, the specific information transmission step, the vehicle remote control determination step, and the remote control related information transmission step. The autonomous driving vehicle may be controlled by the combination of an AI operation and the DL grant receiving process through the specific information transmission step, the vehicle remote control determination step, the DL grant receiving step, and the remote control related information transmission step.

The operation of the autonomous driving vehicle described above is merely exemplary, but the present disclosure is not limited thereto.

For example, the operation of the autonomous driving vehicle may be performed by selectively combining the initial access step, the random access step, the UL grant receiving step, or the DL grant receiving step with the specific information transmission step, or the remote control related information transmission step. The operation of the autonomous driving vehicle may include the random access step, the UL grant receiving step, the specific information transmission step, and the remote control related information transmission step. The operation of the autonomous driving vehicle may include the initial access step, the random access step, the specific information transmission step, and the remote control related information transmission step. The operation of the autonomous driving vehicle may include the UL grant receiving step, the specific information transmission step, the DL grant receiving step, and the remote control related information transmission step.

Figure 5:
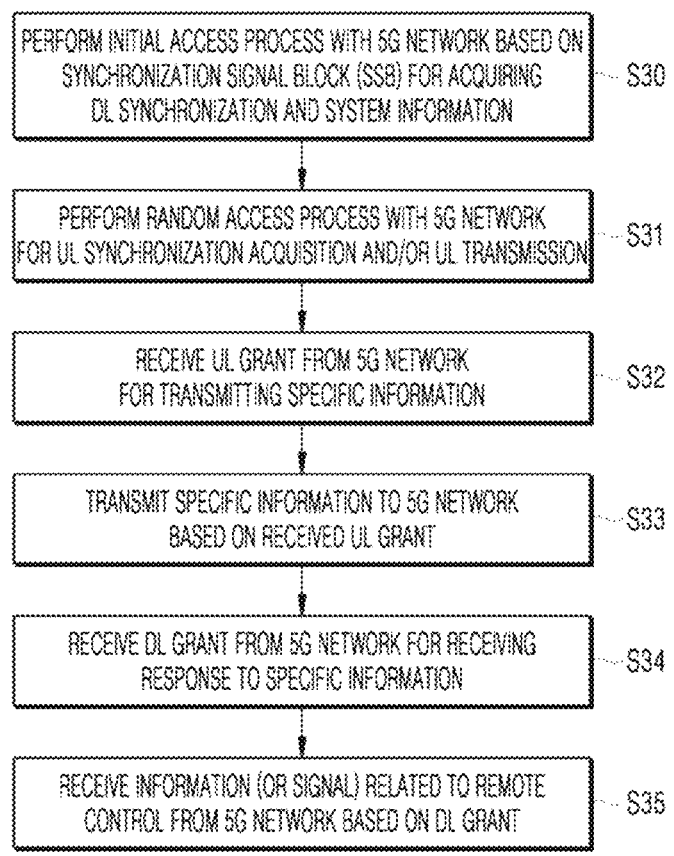
FIGS. 5 to 8 are diagrams illustrating examples of an operation of an autonomous vehicle using 5G communication.

As illustrated in FIG. 5, the vehicle including an autonomous driving module may perform an initial access process with the 5G network based on Synchronization Signal Block (SSB) in order to acquire DL synchronization and system information (initial access step).

The autonomous driving vehicle may perform a random access process with the 5G network for UL synchronization acquisition and/or UL transmission (random access step, S31).

The autonomous driving vehicle may receive the UL grant from the 5G network for transmitting specific information (UL grant receiving step, S32).

The autonomous driving vehicle may transmit the specific information to the 5G network based on the UL grant (specific information transmission step, S33).

The autonomous driving vehicle may receive the DL grant from the 5G network for receiving a response to the specific information (DL grant receiving step, S34).

The autonomous driving vehicle may receive remote control related information (or a signal) from the 5G network based on the DL grant (remote control related information receiving step, S35).

A beam management (BM) process may be added to the initial access step, and a beam failure recovery process associated with Physical Random Access Channel (PRACH) transmission may be added to the random access step. QCL (Quasi Co-Located) relation may be added with respect to the beam reception direction of a Physical Downlink Control Channel (PDCCH) including the UL grant in the UL grant receiving step, and QCL relation may be added with respect to the beam transmission direction of the Physical Uplink Control Channel (PUCCH)/Physical Uplink Shared Channel (PUSCH) including specific information in the specific information transmission step. In addition, QCL relation may be added with respect to the beam reception direction of the PDCCH including the DL grant in the DL grant receiving step.

Figure 6:
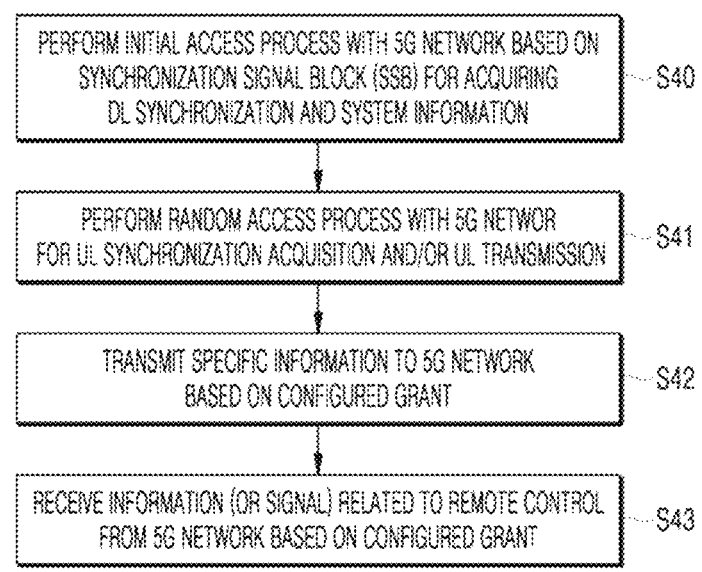

As illustrated in FIG. 6, the autonomous driving vehicle may perform an initial access process with the 5G network based on SSB for acquiring DL synchronization and system information (initial access step, S40).

The autonomous driving vehicle may perform a random access process with the 5G network for UL synchronization acquisition and/or UL transmission (random access step, S41).

The autonomous driving vehicle may transmit specific information based on a configured grant to the 5G network (UL grant receiving step, S42). In other words, the autonomous driving vehicle 1000 may receive the configured grant instead of receiving the UL grant from the 5G network.

The autonomous driving vehicle may receive the remote control related information (or a signal) from the 5G network based on the configured grant (remote control related information receiving step, S43).

Figure 7:
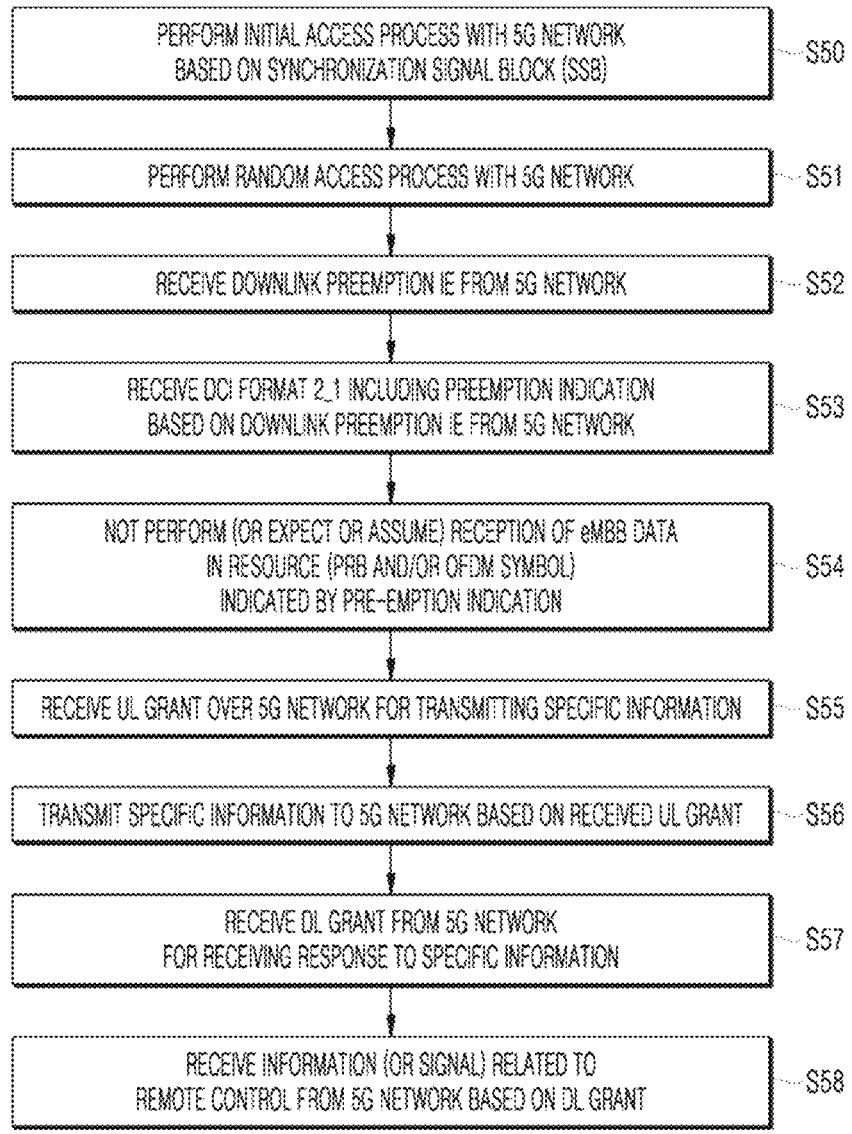

As illustrated in FIG. 7, the autonomous driving vehicle may perform an initial access process with the 5G network based on SSB for acquiring DL synchronization and system information (initial access step, S50).

The autonomous driving vehicle may perform a random access process with the 5G network for UL synchronization acquisition and/or UL transmission (random access step, S51).

In addition, the autonomous driving vehicle may receive Downlink Preemption (DL) and Information Element (IE) from the 5G network (DL Preemption IE reception step, S52).

The autonomous driving vehicle may receive DCI (Downlink Control Information) format 2_1 including preemption indication based on the DL preemption IE from the 5G network (DCI format 2_1 receiving step, S53).

The autonomous driving vehicle may not perform (or expect or assume) the reception of eMBB data in the resource (PRB and/or OFDM symbol) indicated by the pre-emption indication (step of not receiving eMBB data, S54).

The autonomous driving vehicle may receive the UL grant over the 5G network for transmitting specific information (UL grant receiving step, S55).

The autonomous driving vehicle may transmit the specific information to the 5G network based on the UL grant (specific information transmission step, S56).

The autonomous driving vehicle may receive the DL grant from the 5G network for receiving a response to the specific information (DL grant receiving step, S57).

The autonomous driving vehicle may receive the remote control related information (or signal) from the 5G network based on the DL grant (remote control related information receiving step, S58).

Figure 8:
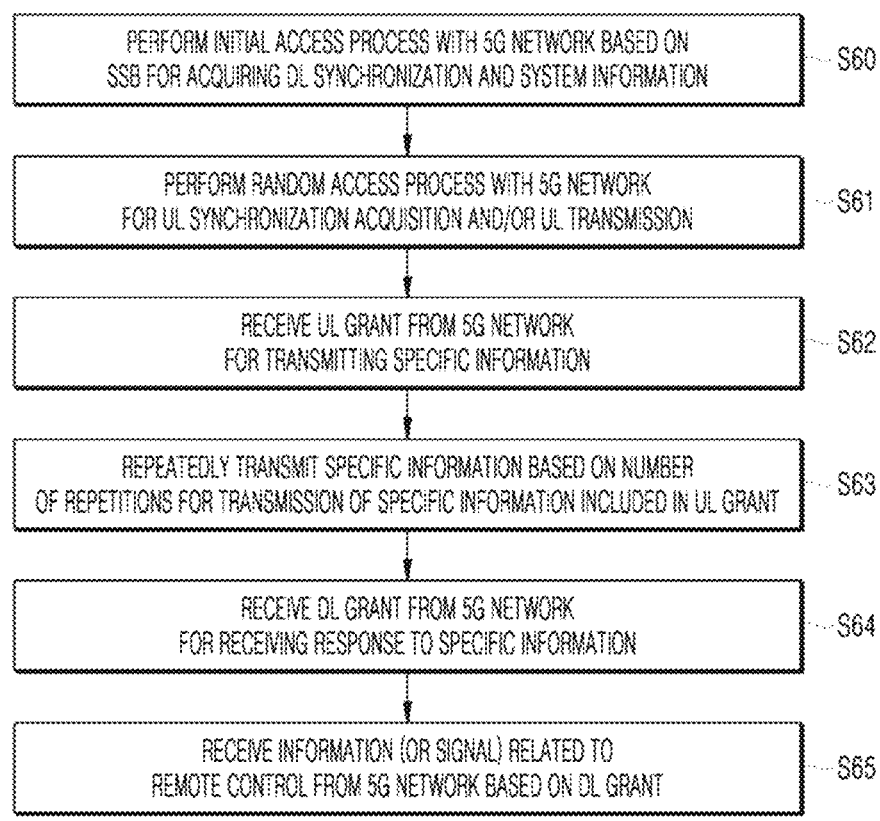

As illustrated in FIG. 8, the autonomous driving vehicle may perform an initial access process with the 5G network based on SSB for acquiring DL synchronization and system information (initial access step, S60).

The autonomous driving vehicle may perform a random access process with the 5G network for UL synchronization acquisition and/or UL transmission (random access step, S61).

The autonomous driving vehicle may receive the UL grant over the 5G network for transmitting specific information (UL grant receiving step, S62).

When specific information is transmitted repeatedly, the UL grant may include information on the number of repetitions, and the specific information may be repeatedly transmitted based on information on the number of repetitions (specific information repetition transmission step, S63).

The autonomous driving vehicle may transmit the specific information to the 5G network based on the UL grant.

The repeated transmission of the specific information may be performed by frequency hopping, and the first transmission of the specific information may be performed from a first frequency resource, and the second transmission of the specific information may be performed from a second frequency resource.

The specific information may be transmitted through Narrowband of Resource Block (6RB) and Resource Block (1RB).

The autonomous driving vehicle may receive the DL grant from the 5G network for receiving a response to the specific information (DL grant receiving step, S64).

The autonomous driving vehicle may receive the remote control related information (or signal) from the 5G network based on the DL grant (remote control related information receiving step, S65).

The above-described 5G communication technique can be applied in combination with the embodiment proposed in this specification, which will be described in FIG. 1 to FIG. 16, or supplemented to specify or clarify the technical feature of the embodiment proposed in this specification.

The vehicle may be connected to an external server through a communication network, and may be capable of moving along a predetermined route without a driver's intervention by using an autonomous driving technique.

In the embodiment described below, a user may be interpreted as a driver, a passenger, or an owner of a user terminal.

While the vehicle is driving in the autonomous driving mode, the type and frequency of accident occurrence may depend on the capability of the vehicle of sensing dangerous elements in the vicinity in real time. The route to the destination may include intervals with different levels of risk based on various causes, such as weather, terrain characteristic, and traffic congestion.

At least one among an autonomous driving vehicle, a user terminal, and a server according to embodiments of the present disclosure may be associated or integrated with an artificial intelligence module, a drone (unmanned aerial vehicle (UAV)), a robot, an augmented reality (AR) device, a virtual reality (VR) device, a 5G service related device, and the like.

For example, the vehicle may operate in association with at least one artificial intelligence module or robot included in the vehicle in the autonomous driving mode.

For example, the vehicle may interact with at least one robot. The robot may be an autonomous mobile robot (AMR) capable of driving by itself. Being capable of driving by itself, the AMR may freely move, and may include a plurality of sensors so as to avoid obstacles during traveling. The AMR may be a flying robot (such as a drone) equipped with a flight device. The AMR may be a wheel-type robot equipped with at least one wheel, and which is moved through the rotation of the at least one wheel. The AMR may be a leg-type robot equipped with at least one leg, and which is moved using the at least one leg.

The robot may function as a device that enhances the convenience of a user of a vehicle. For example, the robot may move a load placed in the vehicle to a final destination. For example, the robot may perform a function of providing route guidance to a final destination to a user who alights from the vehicle. For example, the robot may perform a function of transporting the user who alights from the vehicle to the final destination At least one electronic apparatus included in the vehicle may communicate with the robot through a communication device.

At least one electronic apparatus included in the vehicle may provide, to the robot, data processed by the at least one electronic apparatus included in the vehicle. For example, at least one electronic apparatus included in the vehicle may provide, to the robot, at least one among object data indicating an object near the vehicle, HD map data, vehicle status data, vehicle position data, and driving plan data.

At least one electronic apparatus included in the vehicle may receive, from the robot, data processed by the robot. At least one electronic apparatus included in the vehicle may receive at least one among sensing data, object data, robot status data, robot location data, and robot movement plan data which is generated by the robot.

At least one electronic apparatus included in the vehicle may generate a control signal further based on data received from the robot. For example, at least one electronic apparatus included in the vehicle may compare information on the object generated by an object detection device with information on the object generated by the robot, and generate a control signal based on the comparison result. At least one electronic apparatus included in the vehicle may generate a control signal so that interference between the vehicle movement route and the robot movement route may not occur.

At least one electronic apparatus included in the vehicle may include a software module or a hardware module for implementing an artificial intelligence (AI) (hereinafter referred to as an artificial intelligence module). At least one electronic apparatus included in the vehicle 1000 may input obtained data into the artificial intelligence module, and use data outputted from the artificial intelligence module.

The artificial intelligence module may perform machine learning of input data by using at least one artificial neural network (ANN). The artificial intelligence module may output driving plan data through machine learning of input data.

At least one electronic device included in the vehicle may generate a control signal based on data outputted from the artificial intelligence module.

According to the embodiment, at least one electronic apparatus included in the vehicle may receive data processed by an artificial intelligence from an external device through a communication device. At least one electronic apparatus included in the vehicle may generate a control signal based on the data processed by the artificial intelligence.

The storage 1700 is electrically connected to the inference-purpose data generator 1200, the proximity detector 1300, the target frequency selector 1400, and the model generator 1500. The storage 1700 may store basic data for each unit of the user proximity detection device, control data for controlling the operation of each unit of the user proximity detection device, and input/output data.

The storage 1700 may be various storage devices such as a ROM, a RAM, an EPROM, a flash drive, and a hard drive, in terms of hardware. The storage 1700 may store programs for processing or controlling the inference-purpose data generator 1200, the proximity detector 1300, the target frequency selector 1400, and the model generator 1500, various data for overall operations of the user proximity detection device 1000, in particular, local information for frequency hopping, and learning-purpose data for machine learning models. At this time, the storage 1700 may be formed integrally with the inference-purpose data generator 1200, the proximity detector 1300, the target frequency selector 1400, the model generator 1500, or may be implemented as subcomponents of the inference-purpose data generator 1200, the proximity detector 1300, the target frequency selector 1400, and the model generator 1500.

FIGS. 9 to 11, 13 and 15 are flowcharts illustrating a user proximity detection method according to an embodiment of the present disclosure.

FIGS. 12A to 12C, 14 and 16 illustrate data processing operations of a user proximity detection device according to an embodiment of the present disclosure.

Figure 9:
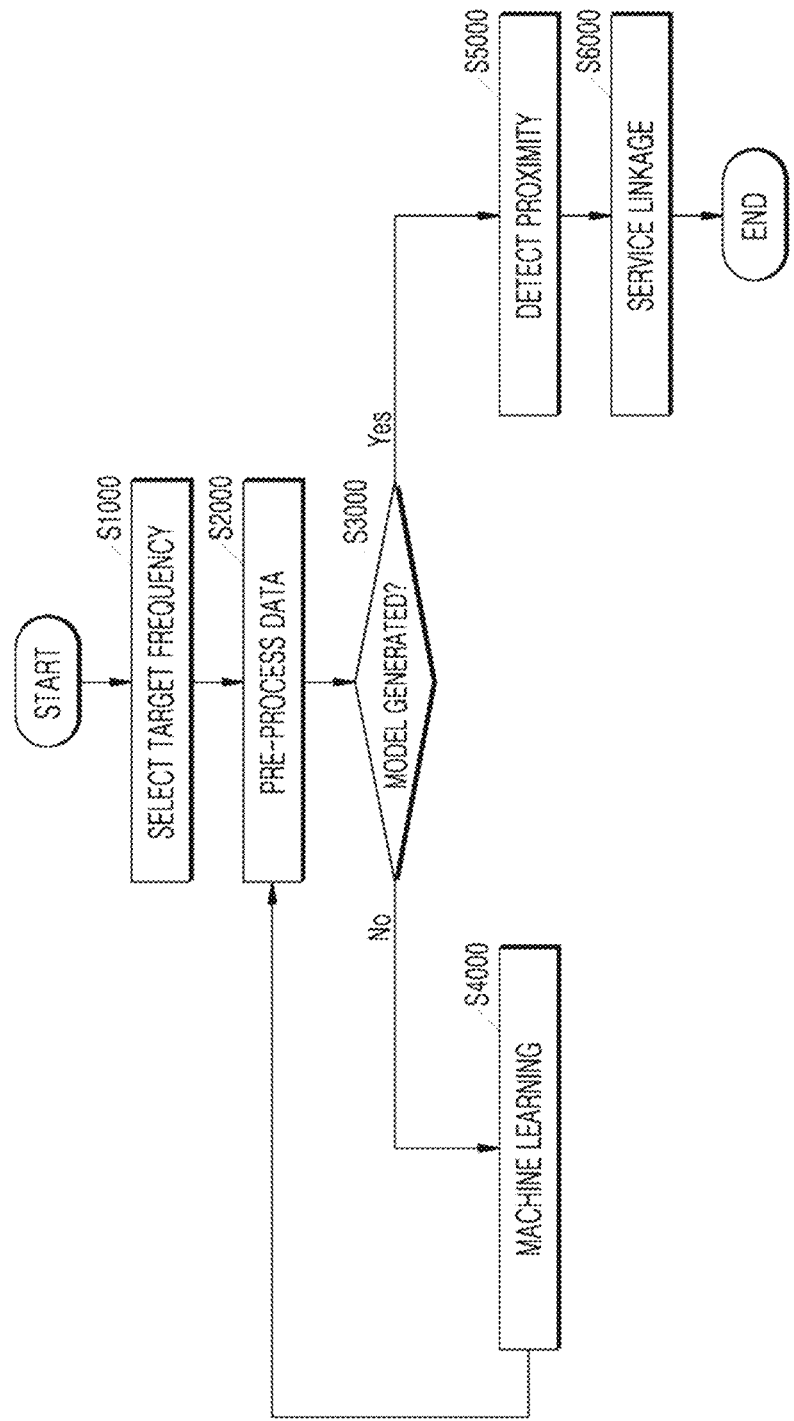
FIGS. 9 to 11, 13 and 15 are flowcharts illustrating a user proximity detection method according to an embodiment of the present disclosure.

Referring to FIG. 9, the target frequency selector 1400 may select a target frequency band to be used among wireless signals of public broadcasts that can be received in a user proximity detection area (S1000).

The inference-purpose data generator 1200 may perform a data pre-processing process of converting a signal of a target frequency band received through the receiver 1100 into a form usable by the model generator 1500 and the proximity detector 1300 (S2000).

If a human body proximity inference machine learning model to be used in the proximity detector 1300 is not generated (S3000), the model generator 1500 may generate a model that extracts and machine-learns a feature according to whether or not the human body is in proximity from the plurality of pre-processed data (S4000).

If a human body proximity inference machine learning model to be used in the proximity detector 1300 is already generated in advance (S3000), the inference-purpose data generated in real time by the inference-purpose data generator 1200 may be inputted to the human body proximity inference machine learning model to detect whether the user is in proximity (S5000).

The proximity detector 1300 may execute a service of the corresponding device by transmitting a control signal generated according to the human body proximity determination result to the corresponding device through the communicator 1600 (S6000).

Figure 10:
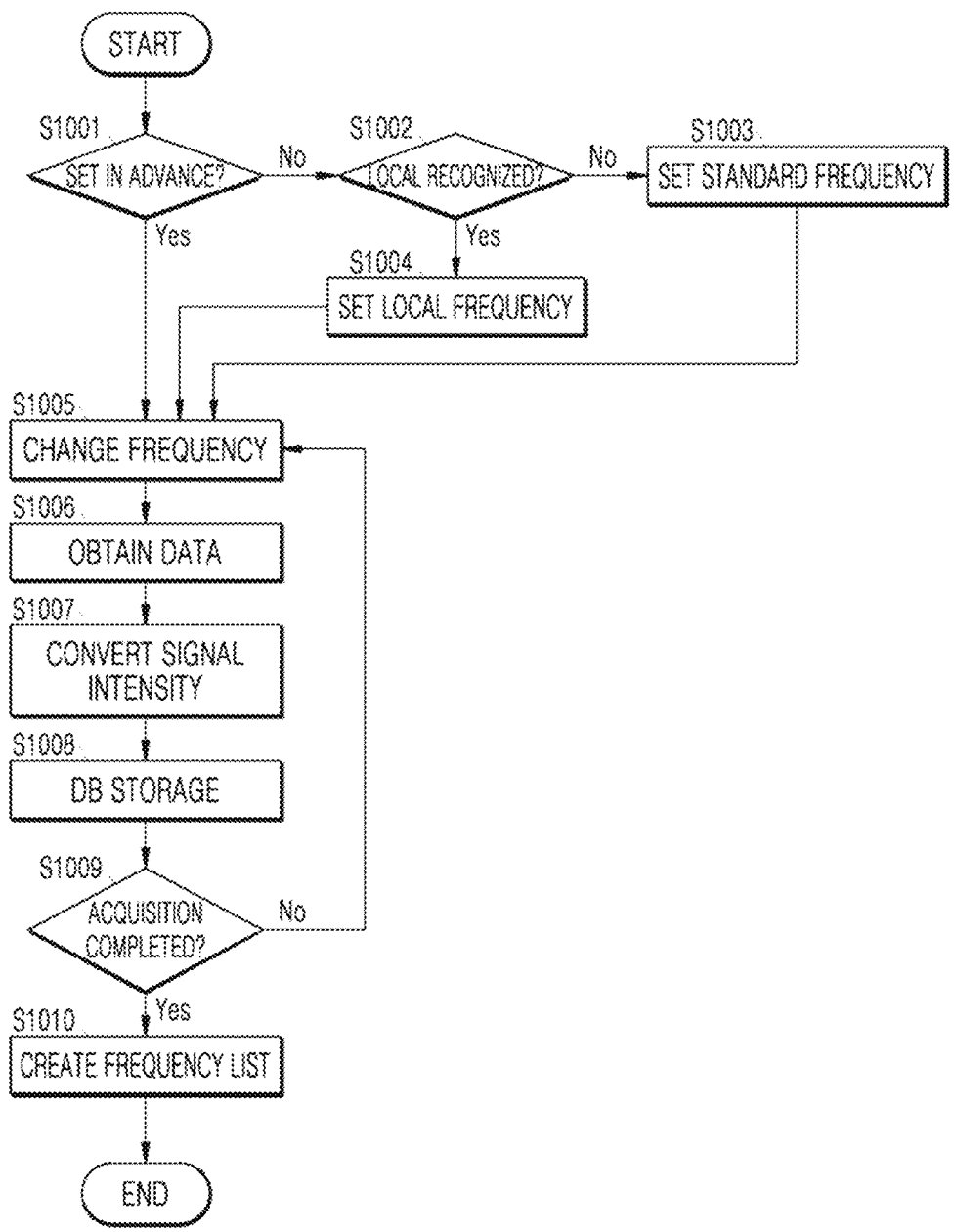

Referring to FIG. 10, the target frequency band selection step S1000 will be described below.

If a hopping-purpose frequency list is previously stored in the storage (1700), the target frequency selector 1400 reads a hopping-purpose frequency list by activating the storage 1700 (S1001).

The hopping-purpose frequency list may be stored in the form of a pair of a center frequency and a bandwidth, as channel information on broadcast frequency bands (MF, HF, VHF, and UHF).

If a hopping-purpose frequency list is not previously stored, the target frequency selector 1400 may determine whether local information can be obtained (S1002).

If local information cannot be obtained, the target frequency selector 1400 adds a standard frequency band to the hopping-purpose frequency list (S1003). For example, the target frequency selector 1400 may perform fine-tuning (FT) while changing the reception frequency by at least one step frequency unit of 50 kHz, 100 kHz, and 200 kHz with respect to 87.5 MHz to 108.0 MHz, which is a general frequency band, in the case of the FM band.

If local recognition is possible to obtain the corresponding local information, the target frequency selector 1400 may add the local broadcast channel to the hopping-purpose frequency list (S1004).

For example, the target frequency selector 1400 may divide the corresponding frequency band into step frequency units for the following regions and add them.

TABLE 1

| Local | Local broadcast channel | Step frequency (kHz) |
|---|---|---|
| USA | AM 530~1710 kHz | 10 |
| | FM 87.7~107.9 MHz | 200 |
| England | AM 522~1620 kHz | 9 |
| | AM 87.5~108 MHz | 50 |
| China | AM 531~1630 kHz | 9 |
| | AM 87.5~108 MHz | 100 |
| Korea | AM 531~1602 kHz | 9 |
| | AM 88.1~107.9 MHz | 200 |

When the creation of the hopping-purpose frequency list in the form of a pair of a center frequency and a bandwidth is completed, the target frequency selector 1400 may perform frequency hopping on the corresponding frequencies (S1005).

The receiver 1100 may acquire I/Q data, that is, an orthogonal signal, by the bandwidth after the center frequency changes, and provide the I/Q data to the inference data generator 1200 (S1006).

The target frequency selector 1400 may obtain a signal intensity value by performing Forward Discrete Fourier Transform on the data provided from the receiver 1100 (S1007).

The target frequency selector 1400 may calculate the maximum value, average value, and the like of the signal intensity for each frequency, and store the calculated data in the storage 1700 (S1008).

The target frequency selector 1400 may determine whether a predetermined time or the number of times condition is satisfied (S1009), and may repeat the data acquisition processes S1005 to S1008 until the condition is satisfied.

If the predetermined time or the number of times condition is satisfied, the target frequency selector 1400 may arrange the channels based on the signal intensity value and select the target frequency band according to the predefined number of channels (S1010).

For example, the target frequency selector 1400 may acquire data through frequency hopping, perform Forward Discrete Fourier Transform on the acquired data to obtain a signal intensity value, and select the target frequency band based on the acquired signal intensity value. For example, the target frequency selector 1400 may calculate a moving average for a predetermined time with respect to the obtained signal intensity value, and select n upper channels, for example, 2 (two) or 3 (three) channels, having a large calculated moving average value, as target frequency bands.

The target frequency selector 1400 may acquire data through frequency hopping, perform Forward Discrete Fourier Transform on the acquired data to obtain a signal intensity value, and select the target frequency band based on the correlation between the acquired signal intensity value and whether the user is in proximity or not. For example, the target frequency selector 1400 may sets a value corresponding to proximity to 0 and a value corresponding to non-proximity to 1, calculate a correlation value between the signal intensity value and a value corresponding to proximity or non-proximity, and select n upper channels, for example, 2 (two) or 3 (three) channels, having a large absolute value of the calculated correlation value, as target frequency bands.

Figure 11:
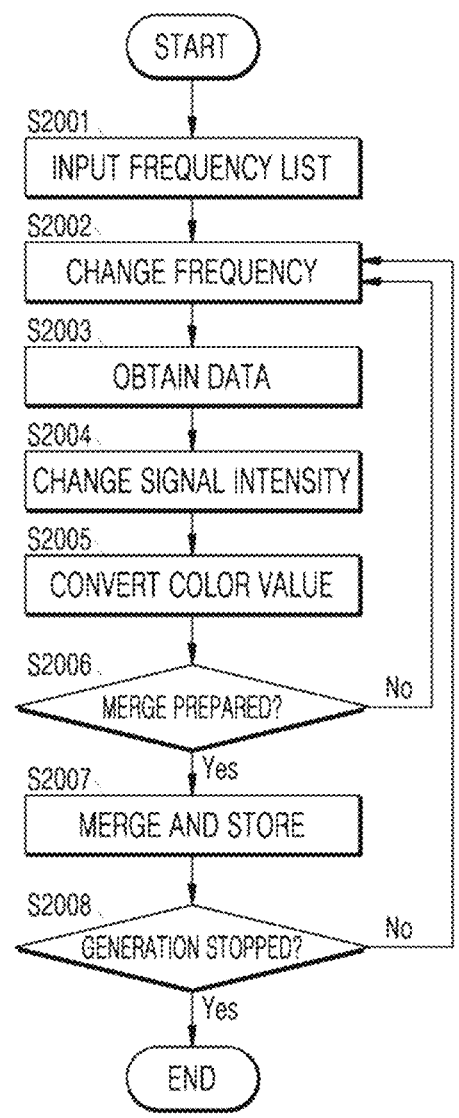

Referring to FIG. 11, the inference-purpose data generator 1200 may receive a target frequency band list provided by the target frequency selector 1400 or the storage 1700 (S2001), and while changing the reception frequency band according to the target frequency band (S2002), acquire data through the receiver 1100 (S2003).

Since the signal intensity may not change linearly due to the relatively low frequency of broadcast signals when the signal is interfered by the human body, if the broadcast signal is used without pre-processing, it may be difficult to set a threshold that is a base of determining whether the human body is in proximity.

Accordingly, as part of the pre-processing process, the inference-purpose data generator 1200 may perform a Forward Discrete Fourier Transform on the signal data received through the receiver 1100 to obtain data converted to a signal intensity value (S2004).

Figure 12A:
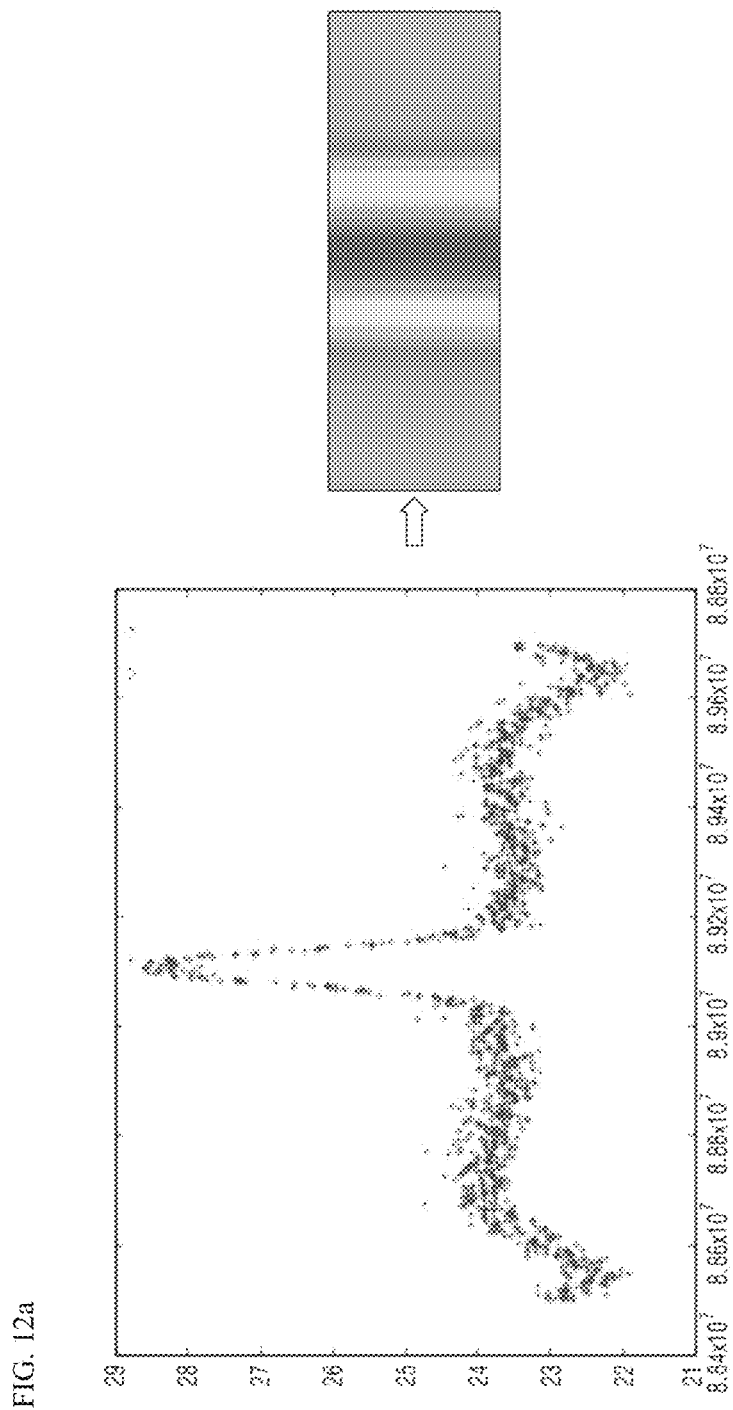
FIGS. 12A to 12C, 14 and 16 illustrate data processing operations of a user proximity detection device according to an embodiment of the present disclosure.

As shown in FIG. 12A, the inference-purpose data generator 1200 may generate image data obtained by converting a signal intensity value for each frequency of a signal received through the receiver 1100 into a color value of a pre-mapped color gamut (S2005).

On the other hand, in relation to each broadcast channel, the intensity of the signal may change variously depending on the transmission station location, frequency band, human body approach direction, and the like.

Therefore, in order to increase the accuracy of detecting the proximity of the human body despite the signal intensity characteristics that vary according to the environment, the inference-purpose data generator 1200 may convert signals for a plurality of frequency bands into image data and merge them together based on the same time axis.

Figure 12B:
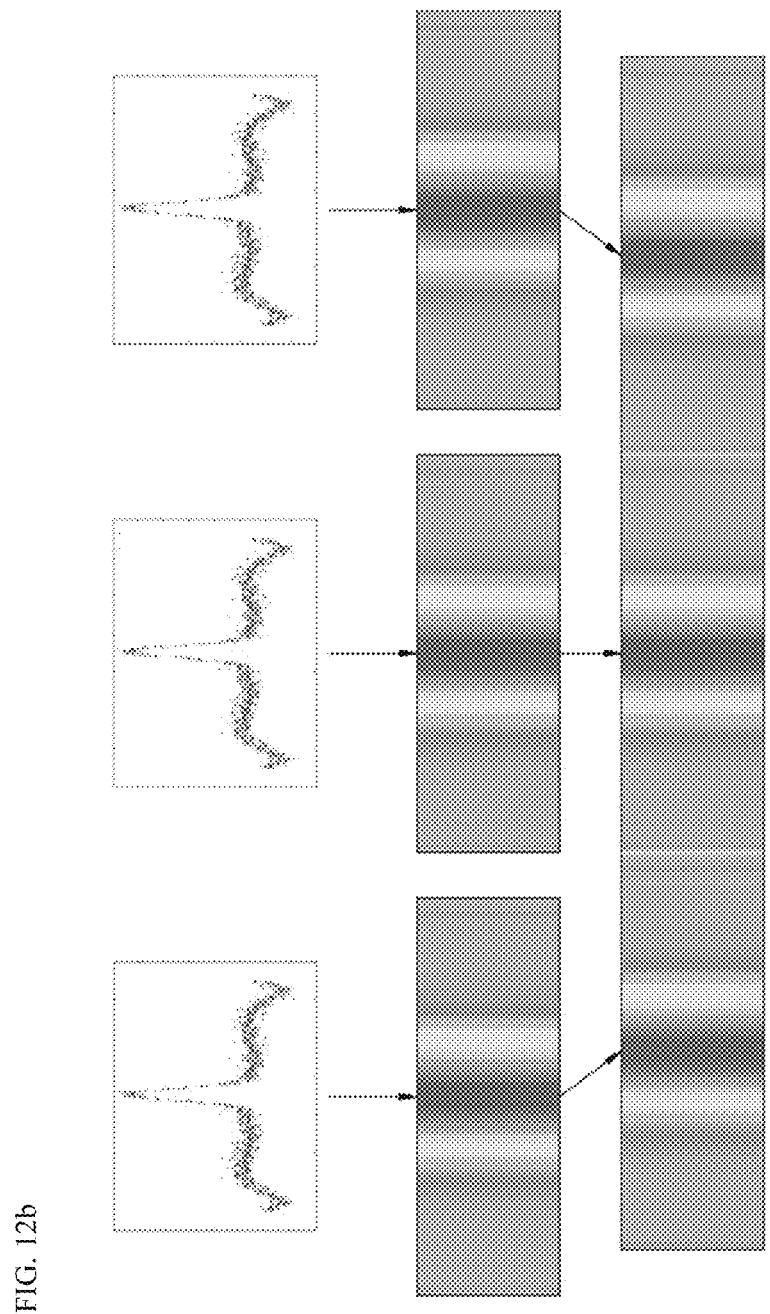

In order to generate data obtained by accumulating and connecting a plurality of data, obtained by converting the intensity values of signals of a plurality of target frequency bands into pre-mapped color values, based on the same time axis as shown in FIG. 12b, the inference-purpose data generator 1200 may determine whether enough data is accumulated (S2006).

If it is determined that image data merge preparation is not completed, the inference-purpose data generator 1200 may again perform the step S2002 of changing the reception frequency band according to the target frequency band.

Meanwhile, if it is determined that image data merge preparation is completed, the inference-purpose data generator 1200 may merge a plurality of image data, obtained by converting intensity values of signals of a plurality of target frequency bands into pre-mapped color values, in parallel to generate one image data, and store the generated image data in the storage 1700 (S2007).

Figure 12C:
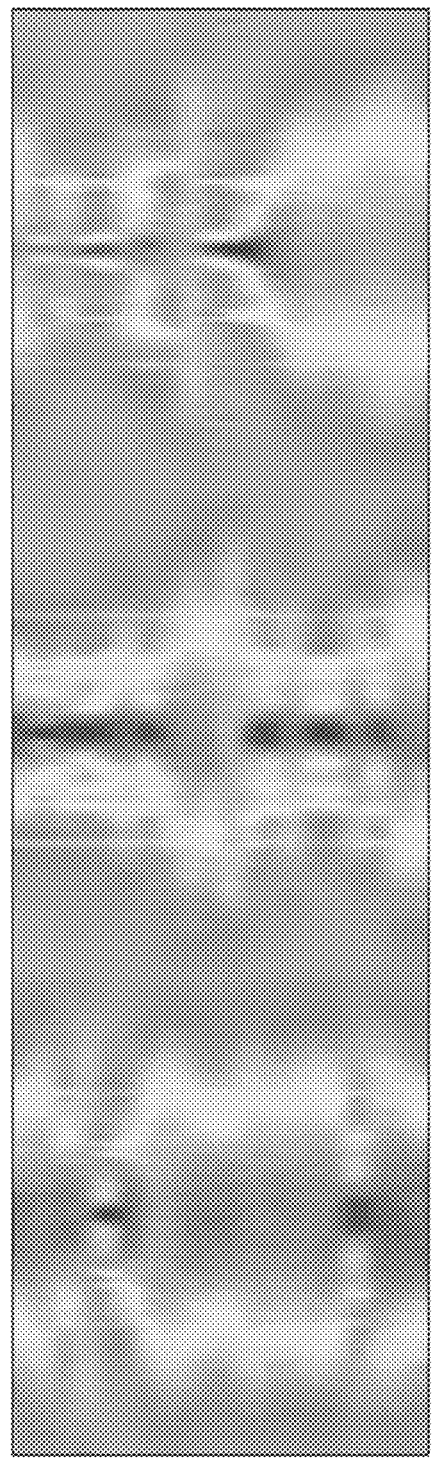

By merging the image data pre-processed in the stored image data in the longitudinal direction over time, the inference-purpose data generator 1200 may generate inference-purpose data as shown in FIG. 12C, and terminate the process when the inference-purpose generation is completed (S2008).

Step S4000 in which the model generator 1500 extracts a feature according to whether the human body is in proximity from the plurality of pre-processed data and generates a machine-learned model will be described as follows.

Figure 13:
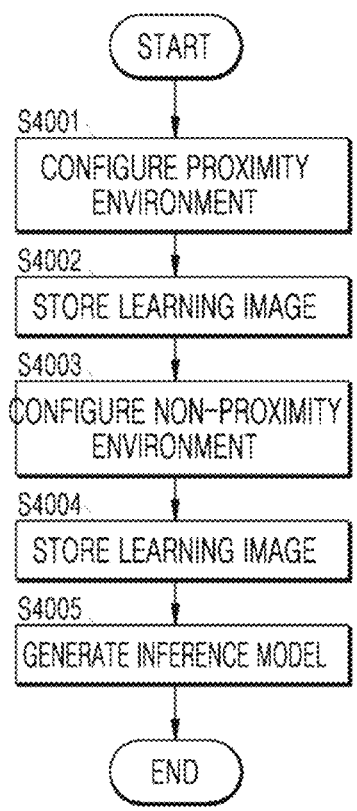

Referring to FIG. 13, the user configures a human body proximity environment such as approaching within a radius of about 1 m from the device (S4001), and the inference-purpose data generator 1200 may generate the learning-purpose data matched with the proximity labels in the same manner as that of generating the inference-purpose data, and store the learning-purpose data in the storage 1700 (S4002).

The user configures a human body non-proximity environment such as moving away from a radius of about 1 m from the device (S4003), and the inference-purpose data generator 1200 may generate the learning-purpose data matched with the non-proximity labels in the same manner as that of generating the inference-purpose data, and store the learning-purpose data in the storage 1700 (S4004).

Figure 14:
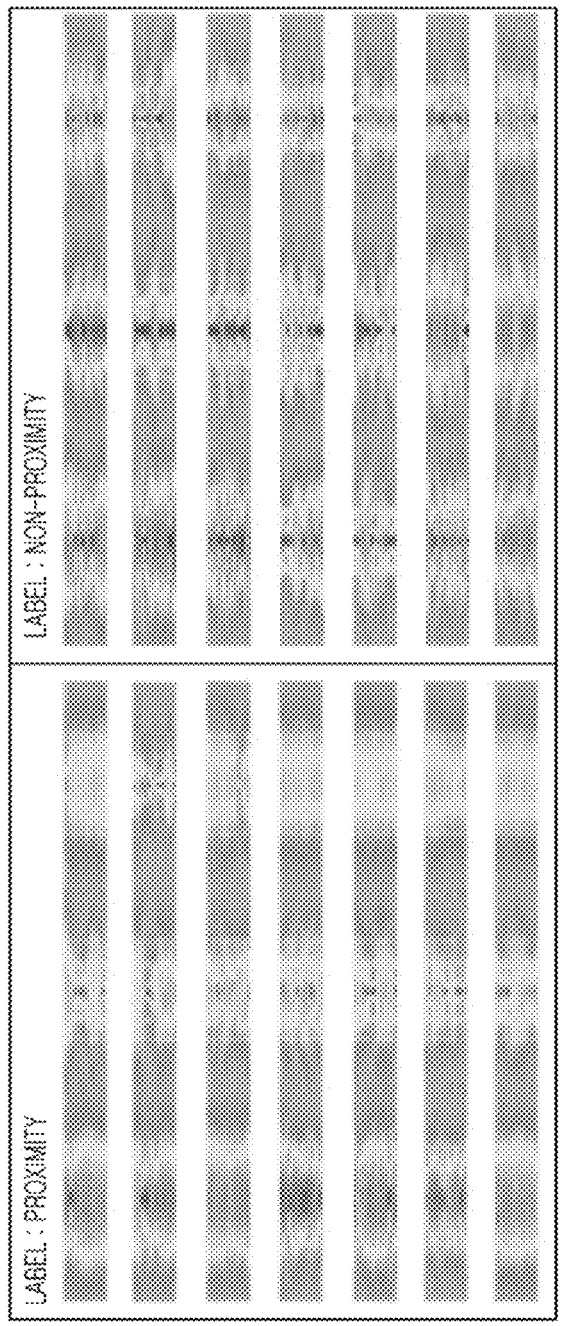

FIG. 14 shows an example of learning-purpose data matched with proximity labels and learning-purpose data matched with non-proximity labels.

The model generator 1500 may generate a human body proximity inference machine learning model that machine-learns features in a user proximity environment by using learning-purpose data stored in the storage 1700 (S4005).

The human body proximity inference machine learning model may be a multi-layer perceptron neural network model or a convolutional neural network model, and when generating a human body proximity inference machine learning model using a deep convolution neural network model, the loss function can use binary cross entropy and the optimizer can use RMSProp.

The data input layer of the deep convolution neural network model may be set according to the size of the input image data and the number of input image channels. For example, when the image data generated through the pre-processing process in the inference-purpose data generator 1200 is an image of 20×357 size of RGB three channels, the data input layer can be configured as a convolution layer as follows.

TABLE 2

| | |
|---|---|
| Convolution layer | Input image size 20 × 357, Three input image channels, Filter size 3 × 3, The number of filters 32, Activation function 'relu'' |

Subsequently, a deep convolutional neural network model may be configured with a maxpooling layer, a convolution layer, a flatten layer, and a dense layer as follows.

TABLE 3

| | |
|---|---|
| Maxpooling layer | Pool size 2 × 2 |
| Convolution layer | Filter size 3 × 3, The number of filters 32, Activation function 'relu' |
| Maxpooling layer | Pool size 2 × 2 |
| Convolution layer | Filter size 3 × 3, The number of filters 64, Activation function 'relu' |
| Maxpooling layer | Pool size 2 × 2 |
| Flatten layer | |
| Dense layer | The number of output neurons 64, Activation function 'relu' |

In addition, in relation to the deep convolution neural network model, it is preferable to add a dropout layer to prevent overfitting as described below.

TABLE 4

| | |
|---|---|
| Dropout layer | 0.3 |

Meanwhile, the output layer of the deep convolution neural network model may be configured with a dense layer having one output as described below to output whether proximity or non-proximity is present.

TABLE 5

| | |
|---|---|
| Dense layer | The number of output neurons 1, Activation function 'relu' |

In the proximity detector 1300, step S5000 of inputting input inference-purpose data generated in real time through the inference-purpose data generator 1200 into the human body proximity inference machine learning model to detect whether the user is in proximity will be described as follows.

Figure 15:
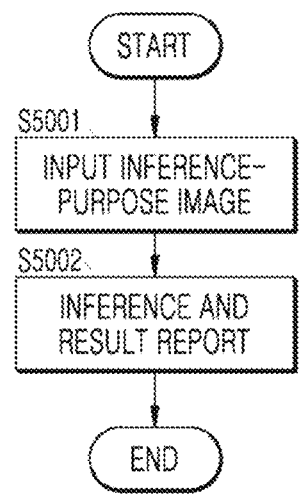

Referring to FIG. 15, the proximity detector 1300 may receive inference-purpose data, that is, an inference image, from the inference-purpose data generator 1200 (S5001). Here, the inputted inference-purpose image may be obtained by merging the image data obtained by converting signals for three target frequency bands, for example, three channels (106.1 MHz, 200 kHz step; 106.9 MHz, 200 kHz step; 107.7 MHz, 200 kHz step) for FM radio band along the same time axis in the form of an input variable as shown in FIG. 16.

Figure 16:
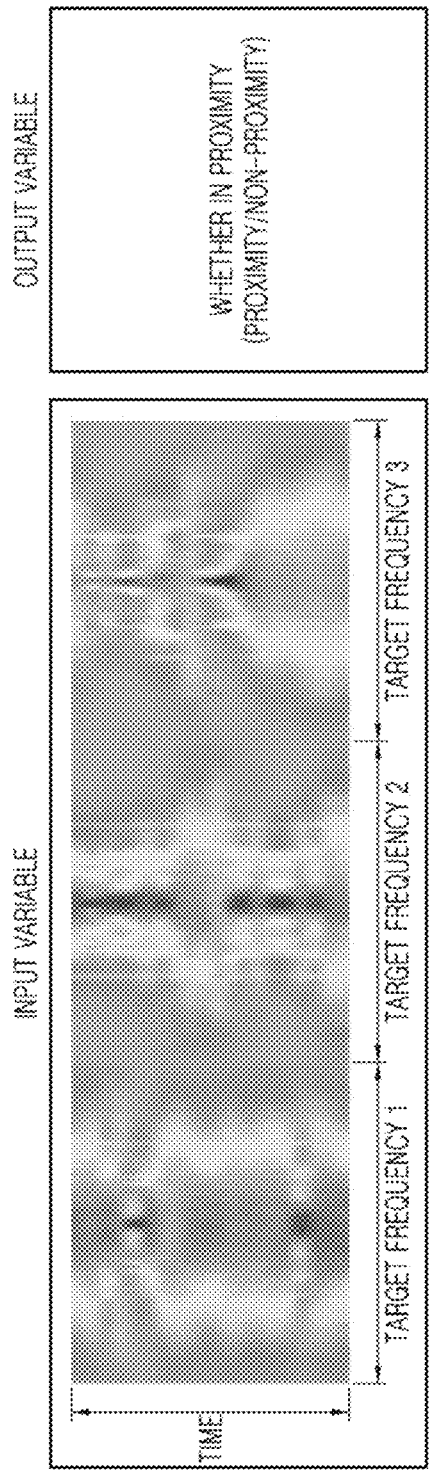

The proximity detector 1300 may input the inference-purpose data into the human body proximity inference machine learning model to provide whether the human body is in proximity as an output variable as shown in FIG. 16.

According to an embodiment of the invention, since broadcast signal interference depending on the proximity of the human body is detected by using the fact that objects and human bodies have different resonant frequency characteristics, it is effective in distinguishing the difference between the object and the human body and accurately detecting the proximity of the human body.

According to an embodiment of the invention, by using the broadcast signal that can be used at all times in each region as a signal for detecting a human body, even without a separate transmitter, it is possible to accurately detect the approach of a human body only with a receiver capable of receiving a broadcast signal.

The effects of the present disclosure are not limited to those mentioned above, and other effects not mentioned can be clearly understood by those skilled in the art from the following description.

The above-mentioned present disclosure may be implemented as a computer-readable code in a recording medium in which at least one program is written. The computer readable medium includes all types of recording devices in which data readable by a computer system readable can be stored. Examples of the computer readable medium include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like, and it may also be implemented in the form of a carrier wave (for example, transmission over the Internet). In addition, the computer may include a processor or a controller. Therefore, the above description should not be construed as limiting and should be considered illustrative. The scope of the present disclosure should be determined by rational interpretation of the appended claims, and all changes within the scope of equivalents of the present disclosure are included in the scope of the present disclosure.

What is claimed is:

1. A user proximity detection device comprising:
   a receiver configured to receive a signal in a target frequency band;
   an inference-purpose data generator configured to measure an intensity of a signal received through the receiver and generate inference-purpose data based on the measured intensity of the signal; and
   a proximity detector configured to input the inference-purpose data into a human body proximity inference machine learning model to determine whether a human body is in proximity,
   wherein the target frequency band is selected from a broadcast frequency band, and
   wherein the inference-purpose data is image data obtained by converting a value of the intensity of the signal received through the receiver into a color value of a pre-mapped color gamut.

2. The user proximity detection device of claim 1, further comprising a first target frequency selector configured to obtain data through frequency hopping, perform Forward Discrete Fourier Transform on the obtained data to obtain a signal intensity value, and select the target frequency band based on the obtained signal intensity value.

3. The user proximity detection device of claim 2, wherein as local information is obtained, the first target frequency selector generates a hopping-purpose frequency list including a local broadcast frequency band corresponding to the local information and performs the frequency hopping based on the generated hopping-purpose frequency list.

4. The user proximity detection device of claim 1, further comprising a second target frequency selector configured to obtain data through frequency hopping, perform Forward Discrete Fourier Transform on the obtained data to obtain a signal intensity value, and select the target frequency band based on a correlation between the obtained signal intensity value and whether or not a user is in proximity.

5. The user proximity detection device of claim 1, wherein the receiver receives a signal including at least two target frequency bands of a first target frequency band and a second target frequency band, and
   wherein the inference-purpose data is data that connects first image data and second image data based on the same time axis, in which the first image data is obtained by converting the value of the intensity of the signal of the first target frequency band into a color value of a pre-mapped color gamut and the second image data is obtained by converting the value of the intensity of the signal of the second target frequency band into a color value of a pre-mapped color gamut.

6. The user proximity detection device of claim 1, wherein the human body proximity inference machine learning model is a model that is learned by first learning-purpose data and second learning-purpose data and infers whether a human body is in proximity when the inference-purpose data is inputted,
   wherein the first learning-purpose data that is a data set including: image data obtained by converting the value of the intensity of the signal received through the receiver into a color value of a pre-mapped color gamut under a human body proximity environment; and a proximity label and
   wherein the second learning-purpose data is a data set including: image data obtained by converting the value of the intensity of the signal received through the receiver into pre-mapped color value under a human body non-proximity environment; and a non-proximity, label.

7. The user proximity detection device of claim 1, wherein the human body proximity inference machine learning model is a multilayer perceptron neural network model.

8. The user proximity detection device of claim 1, further comprising a communicator,
   wherein the proximity detector generates a control signal for activating an external device according to the determination that a human body is in proximity, and transmits the generated control signal through the communicator.

9. The user proximity detection device of claim 3, further comprising a communicator,
   wherein the communicator receives the local information based on a downlink grant of a 5th Generation (5G) network connected for driving in an autonomous driving mode.

10. A user proximity detection method comprising:
    a first step of receiving a signal in a target frequency band;
    a second step of measuring an intensity of a signal received from the first step and generating inference-purpose data based on the measured intensity of the signal; and
    a third step of inputting the inference-purpose data into a human body proximity inference machine learning model to determine whether a human body is in proximity,
    wherein the target frequency band is selected from a broadcast frequency band, and
    wherein the inference-purpose data is image data obtained by converting a value of the intensity of the signal received from the first step into a color value of a pre-mapped color gamut.

11. The user proximity detection method of claim 10, further comprising a frequency band selection step of obtaining data through frequency hopping, performing Forward Discrete Fourier Transform on the obtained data to obtain a signal intensity value, and selecting the target frequency band based on the obtained signal intensity value.

12. The user proximity detection method of claim 11, wherein the frequency hopping is performed based on a hopping-purpose frequency list including a local broadcast frequency band.

13. The user proximity detection method of claim 10, further comprising a step of obtaining data through frequency hopping, performing Forward Discrete Fourier Transform on the obtained data to obtain a signal intensity value, and selecting the target frequency band based on a correlation between the obtained signal intensity value and whether or not a user is in proximity.

14. The user proximity detection method of claim 10, wherein the target frequency band comprises at least two target frequency bands of a first target frequency band and a second target frequency band, and
wherein the inference-purpose data is data that connects first image data and second image data based on the same time axis, in which the first image data is obtained by converting the value of the intensity of the signal of the first target frequency band into a color value of a pre-mapped color gamut and the second image data is obtained by converting the value of the intensity of the signal of the second target frequency band into a color value of a pre-mapped color gamut.

15. The user proximity detection method of claim 10, wherein the human body proximity inference machine learning model is a model that is learned by first learning-purpose data and second learning-purpose data and infers whether a human body is in proximity when the inference-purpose data is inputted,
wherein the first learning-purpose data that is a data set including: image data obtained by converting the value of the intensity of the signal received from the first step into a color value of a pre-mapped color gamut under a human body proximity environment; and a proximity label, and
wherein the second learning-purpose data is a data set including: image data obtained by converting the value of the intensity of the signal received from the first step into pre-mapped color value under a human body non-proximity environment; and a non-proximity label.

16. The user proximity detection method of claim 10, wherein the human body proximity inference machine learning model is a multilayer perceptron neural network model.

17. The user proximity detection method of claim 10, further comprising a step of generating a control signal for activating an external device according to the determination that a human body is in proximity, and transmits the generated control signal.

18. A non-transitory computer-readable medium storing a program that causes a processor to execute a process to detect a user proximity, the process comprising:
a first step of receiving a broadcast signal in a target frequency band;
a second step of measuring an intensity of the broadcast signal received from the first step and generating inference-purpose data based on the measured intensity of the broadcast signal; and
a third step of inputting the inference-purpose data into a human body proximity inference machine learning model to determine whether a human body is in proximity,
wherein the target frequency band is selected from a broadcast frequency band, and
wherein the inference-purpose data is image data obtained by converting a value of the intensity of the signal received from the first step into a color value of a pre-mapped color gamut.

\* \* \* \* \*